(12) United States Patent
Song et al.

(10) Patent No.: US 11,443,183 B2
(45) Date of Patent: Sep. 13, 2022

(54) NEURAL PROCESSING SYSTEM

(71) Applicant: SAMSUNG ELECTRONICS CO., LTD., Suwon-Si (KR)

(72) Inventors: Jin Ook Song, Seongnam-si (KR); Jun Seok Park, Hwaseong-si (KR); Yun Kyo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 16/507,995

(22) Filed: Jul. 10, 2019

(65) Prior Publication Data

US 2020/0082263 A1  Mar. 12, 2020

(30) Foreign Application Priority Data

Sep. 7, 2018  (KR) .......................... 10-2018-0106917

(51) Int. Cl.
*G06N 3/08* (2006.01)
*G06N 3/04* (2006.01)
(Continued)

(52) U.S. Cl.
CPC .............. *G06N 3/08* (2013.01); *G06N 3/0454* (2013.01); *G06F 1/06* (2013.01); *G06F 1/26* (2013.01)

(58) Field of Classification Search
CPC .......... G06N 3/08; G06N 3/0454; G06F 1/06; G06F 1/26
(Continued)

(56) References Cited

U.S. PATENT DOCUMENTS 5,627,943 A  5/1997 Yoneda et al.
5,799,134 A  8/1998 Chiueh et al.
(Continued)

FOREIGN PATENT DOCUMENTS

WO  WO17166568 A1  10/2017

OTHER PUBLICATIONS

"Yu-Hsin Chen, et al. ""Eyeriss: An Energy-Efficient Reconfigurable Accelerator for Deep ConvolutionalNeural Networks""", in IEEE Journal of Solid-State Circuits, vol. 52, No. 1, Jan. 2017".
(Continued)

*Primary Examiner* — Tomi Skibinski
(74) *Attorney, Agent, or Firm* — Volentine, Whitt & Francos, PLLC

(57) ABSTRACT

A neural processing system includes a first frontend module, a second frontend module, a first backend module, and a second backend module. The first frontend module executes a feature extraction operation using a first feature map and a first weight, and outputs a first operation result and a second operation result. The second frontend module executes the feature extraction operation using a second feature map and a second weight, and outputs a third operation result and a fourth operation result. The first backend module receives an input of the first operation result provided from the first frontend module and the fourth operation result provided from the second frontend module via a second bridge to sum up the first operation result and the fourth operation result. The second backend module receives an input of the third operation result provided from the second frontend module and the second operation result provided from the first frontend module via a first bridge to sum up the third operation result and the second operation result.

20 Claims, 16 Drawing Sheets

(51) Int. Cl.
*G06F 1/26* (2006.01)
*G06F 1/06* (2006.01)

(58) Field of Classification Search
USPC .......................................................... 706/25
See application file for complete search history.

(56) References Cited

U.S. PATENT DOCUMENTS

| | | |
|---|---|---|
| 9,437,317 B2 | 9/2016 | Kim et al. |
| 9,477,925 B2 | 10/2016 | Seide et al. |
| 9,836,692 B1 | 12/2017 | Gulland |
| 2015/0324685 A1 | 11/2015 | Bohn et al. |
| 2016/0328646 A1 | 11/2016 | Lin et al. |
| 2017/0011288 A1* | 1/2017 | Brothers ............... G06F 9/3017 |
| 2017/0220929 A1 | 8/2017 | Rozen et al. |

OTHER PUBLICATIONS

"Jorge Albericio, et al, ""Cnvlutin: Ineffectual-Neuron-Free Deep NeuralNetwork Computing""", in 2016 ACM/IEEE 43rd Annual International Symposium on Computer Architecture".

* cited by examiner

NEURAL PROCESSING SYSTEM

CROSS-REFERENCE TO RELATED APPLICATION

This U.S. non-provisional patent application claims priority to Korean Patent Application No. 10-2018-0106917, filed on Sep. 7, 2018 in the Korean Intellectual Property Office, the disclosure of which is incorporated herein in its entirety by reference.

BACKGROUND

1. Field of the Disclosure

The present disclosure relates to a neural processing system.

2. Description of the Related Art

Deep learning refers to a type of operations based on a deep learning architecture that uses an algorithm set that attempts to model a high-level abstraction from input data, using a deep graph with multiple processing levels in a hierarchy. In general, the deep learning architecture may include multiple neuron hierarchies and parameters. A Convolutional Neural Network (CNN) in the deep learning architecture is widely used in many artificial intelligence and machine learning applications, such as image classification, image caption creation, visual question responses and in automated driving vehicles.

Since the CNN system includes many parameters and requires many operations, for example, for image classification, it has high complexity. As a result, in order to implement the CNN system, the cost of hardware resources becomes problematic, and an amount of electric power consumed by the hardware resources also becomes problematic. Particularly, in the case of a CNN implemented in recent mobile systems (e.g., mobile communication devices), architecture capable of implementing artificial intelligence, while having low cost and low power consumption is required.

SUMMARY

Aspects of the present disclosure provide a neural network system capable of implementing artificial intelligence, while having low cost and low power consumption.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, a neural processing system includes a first frontend module, a second frontend module, a first backend module, and a second backend module. The first frontend module executes a feature extraction operation using a first feature map and a first weight, and outputs a first operation result and a second operation result. The second frontend module executes the feature extraction operation using a second feature map and a second weight, and outputs a third operation result and a fourth operation result. The first backend module receives an input of the first operation result provided from the first frontend module and the fourth operation result provided from the second frontend module via a second bridge to sum up the first operation result and the fourth operation result. The second backend module receives an input of the third operation result provided from the second frontend module and the second operation result provided from the first frontend module via a first bridge to sum up the third operation result and the second operation result.

According to another aspect of the present disclosure, a neural processing system including a first neural processing unit, a bridge unit, and a second neural processing unit. The first neural processing unit includes a first frontend module and a first backend module. The bridge unit is electrically connected to the first neural processing unit. The second neural processing unit operates in a clock domain different from the first neural processing unit. The first frontend module provides a part of a first operation result obtained by executing a feature extraction operation using a first feature map and a first weight, to the first backend module. The bridge unit provides a part of a second operation result executed in the second neural processing unit, to the first backend module. The first backend module sums up the part of the first operation result and the part of the second operation result.

According to another aspect of the present disclosure, a neural processing system includes a first neural processing unit, a second neural processing unit, and a workload manager. The first neural processing unit includes a first frontend module and a first backend module The second neural processing unit includes a second frontend module and a second backend module. The workload manager allocates first data among data for executing feature extraction to the first neural processing unit, and allocates second data among the data to the second neural processing unit. The first frontend module executes a feature extraction operation on the first data, using a first feature map and a first weight, and outputs a first operation result and a second operation result. The second frontend module executes the feature extraction operation on the second data, using a second feature map and a second weight, and outputs a third operation result and a fourth operation result. The first backend module sums up the first operation result and the fourth operation result. The second backend module sums up the third operation result and the second operation result.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

Figure 1:
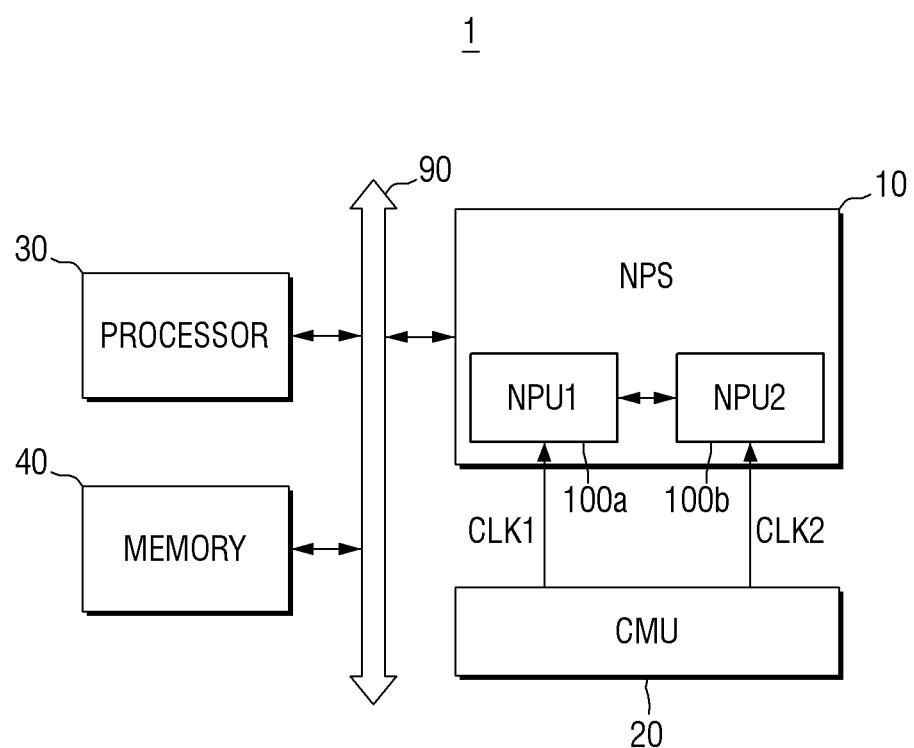
FIG. 1 is a schematic diagram illustrating a computing system according to an embodiment of the present disclosure.

FIG. 1 is a schematic diagram illustrating a computing system according to an embodiment of the present disclosure.

Referring to FIG. 1, a computing system 1 according to an embodiment of the present disclosure includes a neural processing system 10, a clock management unit 20 (CMU), a processor 30 and a memory 40. The neural processing system 10, the processor 30 and the memory 40 may transmit and receive data through a bus 90. The neural processing system 10 may be or include one or more neural network processor that may implement the convolutional neural network (CNN) such as by executing instructions and processing data. However, the present disclosure is not limited thereto. That is, the neural processing system 10 may alternatively be implemented by a processor that processes arbitrary vector operations, matrix operations, and the like. The neural processing system 10 may also include instructions stored therein, or may execute instructions stored in the memory 40 or dynamically received from an external source. The neural processing system 10 may also include a memory that is dynamically updated in the course of the learning described herein, to update what is learned so as to dynamically update new learning. An example of a neural network processor is a graphics processing unit (GPU), though more than one processor such as multiple GPUs may be used to implement the neural processing system 10. Thus, as used herein, the neural processing system 10 includes at least the neural network processor, but may also be considered to include functionally separable but interdependent software modules, functionally separable but interdependent circuit modules of individual circuit components, data and memory particular to each module and/or unit, and other elements as described herein. Moreover, though the neural processing system 10 is shown in FIG. 1 and described with respect thereto as being separate from the clock management unit 20, the processor 30 and the memory 40, functionality implemented by the neural processing system 10 may be partially implemented by or using resources of the clock management unit 20, the processor 30 and the memory 40.

Additionally, the computing system 1 in FIG. 1 may be a computer system that includes one or more computing devices that each include one or more processors. A processor for the computing system 1 is tangible and non-transitory. The term "non-transitory" specifically disavows fleeting characteristics such as characteristics of a carrier wave or signal or other forms that exist only transitorily in any place at any time. A processor is an article of manufacture and/or a machine component. A processor for a computer system that implements the neural processing system 10 in FIG. 1 or other embodiments herein is configured to execute software instructions to perform functions as described in the various embodiments herein. A processor for a computer system may be a general-purpose processor, part of an application specific integrated circuit (ASIC), a microprocessor, a microcomputer, a processor chip, a controller, a microcontroller, a digital signal processor (DSP), a state machine, or a programmable logic device. A processor for a computer system may also be a logical circuit, including a programmable gate array (PGA) such as a field programmable gate array (FPGA), or another type of circuit that includes discrete gate and/or transistor logic. A processor may also be a central processing unit (CPU), a graphics processing unit (GPU), or both. Additionally, any processor described herein may include multiple processors, parallel processors, or both. Multiple processors may be included in, or coupled to, a single device or multiple devices.

A computer system that implements the computing system 1 in FIG. 1 may implement all or parts of the methods described herein. For example, functionality such as feature extraction, summing, and activating and so on as described herein may be implemented by a computer system executing software instructions via a processor or processors described herein In this embodiment, the neural processing system 10 may implement and/or process a neural network that includes multiple layers, such as a feature extraction layer and a feature classification layer. Here, the feature extraction layer corresponds to an initial layer of the neural network, and may be used, for example, for extracting low-level features such as edge and gradient from an input image. On the other hand, the feature classification layer corresponds to a secondary layer of the neural network, and may be used, for example, for extracting more complicated and high-level features such as face, eyes, nose from the input image. By way of explanation, the feature extraction layer may be considered to extract the low-level features before the feature classification layer extracts the more complicated and high-level features. The feature classification layer corresponds to a fully-connected layer.

In order to extract features from the input image, the neural processing system 10 may calculate an input image or a feature map, using a filter or a kernel. For example, the neural processing system 10 may execute a convolve operation on the input image or the feature map, using a convolution filter or a convolution kernel. In addition, the neural processing system 10 may utilize a weight that may correspond to the feature map, which is determined depending on the purpose of specific implementation, for the operation.

In this embodiment, it is particularly noted that the neural processing system 10 includes multiple neural processing units including a first neural processing unit 100a and a second neural processing unit 100b. The first neural processing unit 100a and the second neural processing unit 100b may be implemented by physically separate neural network processors as described above, and/or by logically and/or functionally separated software modules executes by the same or different physically separate neural network processors. For convenience of explanation, in this embodiment, the neural processing system 10 is illustrated as including the first neural processing unit 100a and the second neural processing unit 100b, but the scope of the present disclosure is not limited thereto. Depending on the purpose of the specific implementation, the neural processing system 10 may include n (here, n is a natural number of 2 or more) neural processing units.

The use of multiple neural processing units such as the first neural processing unit 100a and the second neural processing unit 100b as described herein provides several practical opportunities to lower costs and/or power consumption.

The clock management unit 20 generates a first clock signal CLK1 and a second clock signal CLK2 for driving the neural processing system 10. The clock management unit 20 provides the first clock signal CLK1 and the second clock signal CLK2 to each of the first neural processing unit 100a and the second neural processing unit 100b. Thus, the first neural processing unit 100a is driven in accordance with the first clock signal CLK1. The second neural processing unit 100b is driven in accordance with the second clock signal CLK2. As explained herein, the different clocks can be selectively controlled in a manner that lowers power consumption, increases power consumption, lowers processing speeds or increases processing speeds for the different neural processing units such as the first neural processing unit 100a and the second neural processing unit 100b.

In some embodiments of the present disclosure, the frequencies of the first clock signal CLK1 and the second clock signal CLK2 may be different from each other. In other words, a clock domain in which the first neural processing unit 100a operates may be different from a clock domain in which the second neural processing unit 100b operates.

The clock management unit 20 may control each of the frequencies of the first clock signal CLK1 and the second clock signal CLK2, as required. In addition, the clock management unit 20 may also execute clock gating on the first clock signal CLK1 and the second clock signal CLK2 as required.

The processor 30 is a processor that executes general arithmetic operations that are distinguished from artificial intelligence operations, vector operations, matrix operations, and the like which are processed by the neural processing system 10. The processor 30 may include, for example, a CPU (Central Processing Unit), a GPU (Graphic Processing Unit), and the like, but the scope of the present disclosure is not limited thereto. In this embodiment, the processor 30 may generally control the computing system 1.

The memory 40 may store data used when the processor 30 executes an application or controls the computing system 1. The memory 40 may also be used to store data for the neural processing system 10, though the neural processing system 10 may include its own memory to store instructions and data. The memory 40 may be, for example, a DRAM (Dynamic Random-Access Memory), but the scope of the present disclosure is not limited thereto. In this embodiment, image data to be processed by the neural processing system 10 using the CNN, for example, may be stored in the memory 40.

Figure 2:
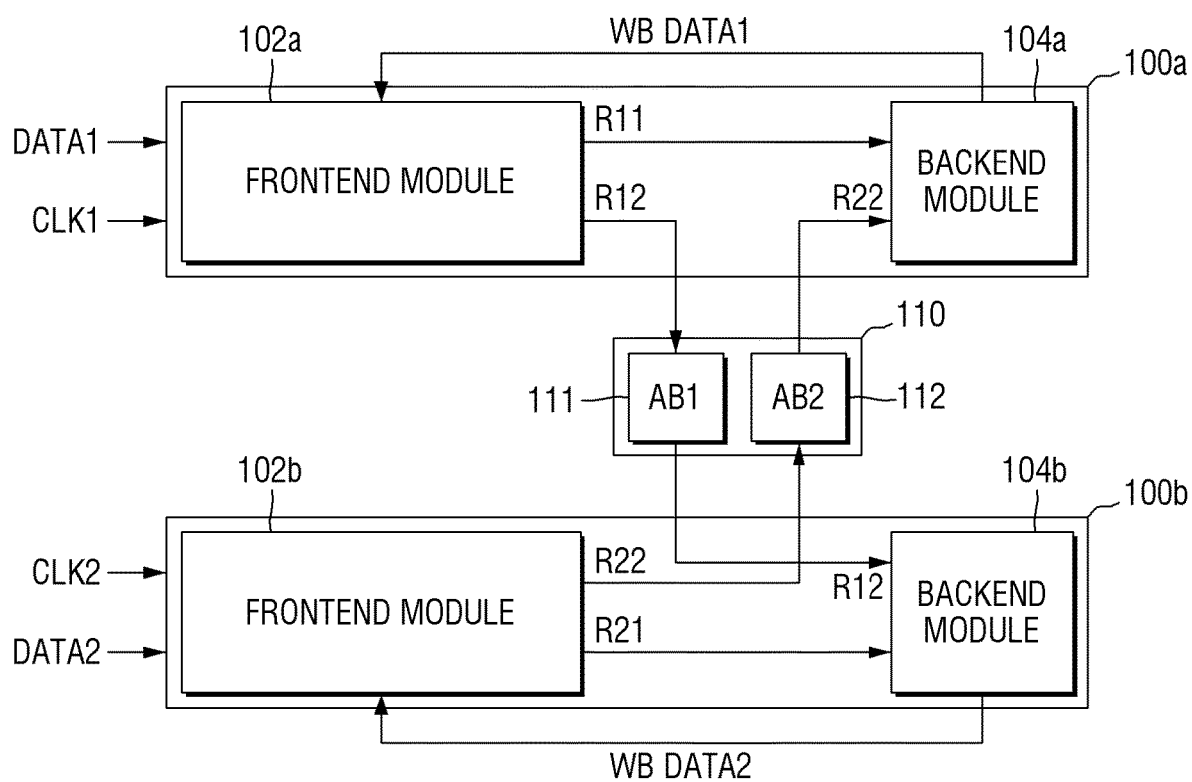
FIG. 2 is a block diagram illustrating a neural processing system according to an embodiment of the present disclosure.

FIG. 2 is a block diagram illustrating the neural processing system according to an embodiment of the present disclosure.

Referring to FIG. 2, the neural processing system 10 according to an embodiment of the present disclosure includes a first neural processing unit 100a and a second neural processing unit 100b. A bridge unit 110 is disposed between the first neural processing unit 100a and the second neural processing unit 100b. As noted above, the first neural processing unit 100a and the second neural processing unit 100b may be physically separate and functionally separate. As explained herein, the use of one or more bridges such as in a bridge unit 110 enhances the practical ability to selectively control the first neural processing unit 100a and the second neural processing unit 100b in a manner that lowers power consumption, increases power consumption, lowers processing speeds or increases processing speeds.

First, the bridge unit 110 includes a first bridge 111 and a second bridge 112. The first bridge 111 is for transmitting the intermediate result generated by the operation of the first neural processing unit 100a to the second neural processing unit 100b. The second bridge 112 is for transmitting the intermediate result generated by the operation of the second neural processing unit 100b to the first neural processing unit 100a.

To this end, the first neural processing unit 100a and the second neural processing unit 100b may operate in mutually different clock domains. In this circumstance, the bridge unit 110 may be electrically connected to the first neural processing unit 100a and to the second neural processing unit 100b operating in the clock domain different from the first neural processing unit 100a.

Thus, when the first neural processing unit 100a and the second neural processing unit 100b operate in mutually different clock domains, the first bridge 111 and the second bridge 112 included in the bridge unit 110 are implemented as asynchronous bridges to allow data to transmit between the clock domains different from each other.

In this embodiment, the first neural processing unit 100a includes a first frontend module 102a and a first backend module 104a. The second neural processing unit 100b includes a second frontend module 102b and a second backend module 104b. The first neural processing unit 100a may process the first data DATA1 among the data to be processed by the neural processing system 10. The second neural processing unit 100b may process the second data DATA2 among the data to be processed by the neural processing system 10. Specifically, the first frontend module 102a executes a feature extraction operation on the first data DATA1, using the first feature map and the first weight, and outputs the first operation result R11 and the second operation result R12. Further, the second frontend module 102b executes a feature extraction operation on the second data DATA2, using the second feature map and the second weight, and outputs the third operation result R21 and the fourth operation result R22.

The first backend module 104a receives the first operation result R11 provided from the first frontend module 102a, and the fourth operation result R22 provided from the second frontend module 102b through the second bridge 112. The first backend module 104a sums up the first operation result R11 and the fourth operation result R22. On the other hand, the second backend module 104b receives the third operation result R21 provided from the second frontend module 102b and the second operation result R12 provided from the first frontend module 102a through the first bridge 111. The second backend module 104b sums up the third operation result R21 and the second operation result R12.

In some embodiments of the disclosure, the first frontend module 102a and the first backend module 104a are driven in accordance with the first clock signal CLK1, and the second frontend module 102b and the second backend module 104b may be driven in accordance with the second clock signal CLK2 which is different in frequency from the first clock signal CLK1. That is, the first frontend module 102a and the first backend module 104a may operate in the clock domain different from the second frontend module 102b and the second backend module 104b.

On the other hand, in this embodiment, the first backend module 104a may provide the first writeback data WB DATA1 to the first frontend module 102a, and the second backend module 104b may provide second writeback data WB DATA2 to the second frontend module 102b. The first writeback data WB DATA1 and the second writeback data WB DATA2 are input to each of the first frontend module 102a and the second frontend module 102b to allow repetition of the feature extraction operation.

Figure 3:
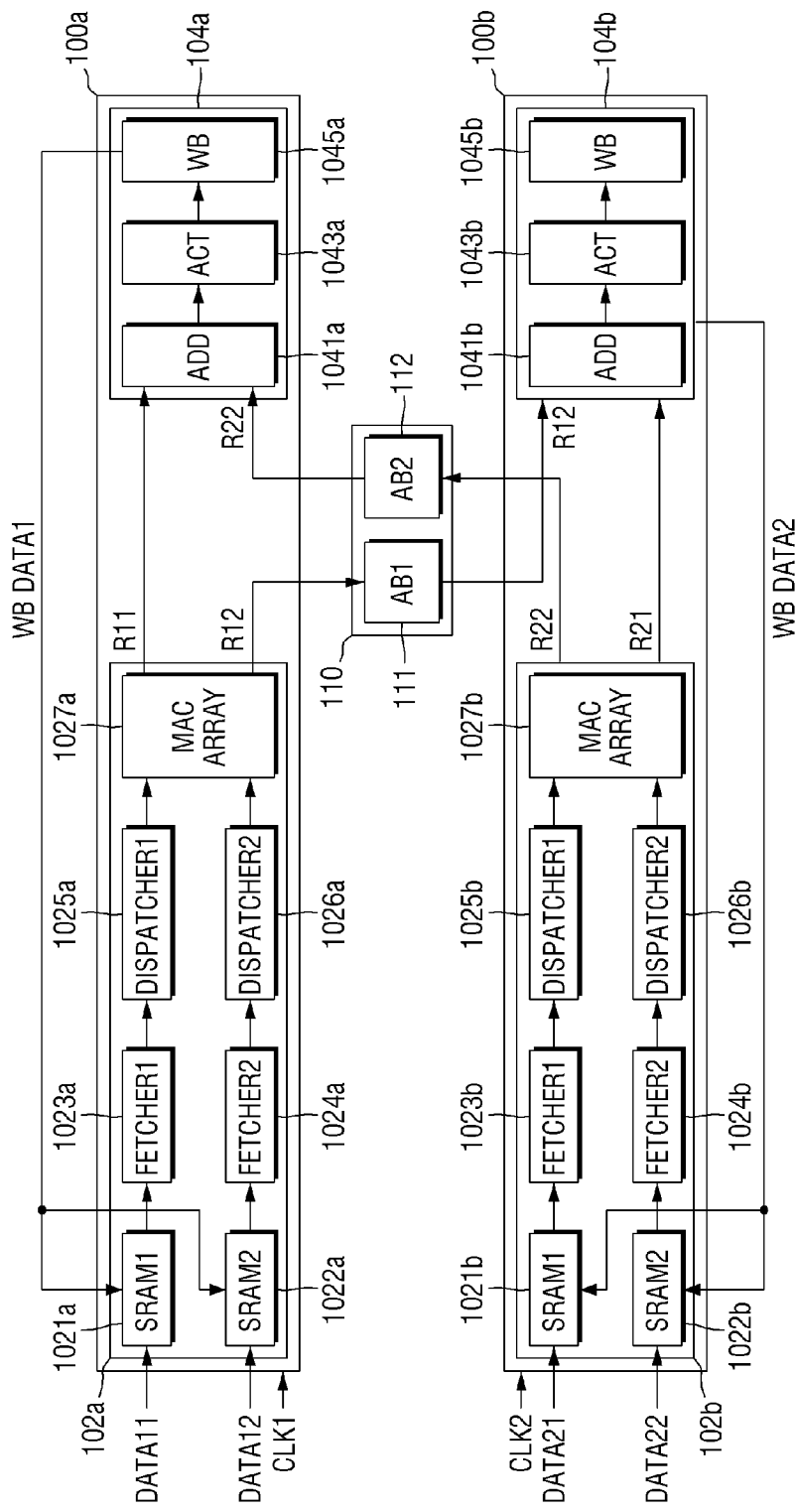
FIG. 3 is a block diagram illustrating the neural processing system according to an embodiment of the present disclosure.

Referring now to FIG. 3, a more detailed structure of the neural processing system 10 according to an embodiment of the present disclosure will be described.

FIG. 3 is a block diagram illustrating the neural processing system according to an embodiment of the present disclosure.

Referring to FIG. 3, the first frontend module 102a included in the first neural processing unit 100a of the neural processing system 10 according to an embodiment of the present disclosure includes multiple first internal memories 1021a, 1022a, multiple first fetch units 1023a, 1024a, multiple first dispatch units 1025a, 1026a, and a first MAC array 1027a (multiplication and accumulation array).

The first internal memories 1021a, 1022a may store a first feature map and a first weight used by the first frontend module 102a for feature extraction operation of data DATA11, DATA12. In this embodiment, the first internal memories 1021a, 1022a may be implemented as a SRAM (Static Random-Access Memory), but the scope of the present disclosure is not limited thereto.

The first fetch units 1023a, 1024a fetch the first feature map and the first weight from each of the first internal memories 1021a, 1022a, and transmit the first feature map and the first weight to the first dispatch units 1025a, 1026a.

The first dispatch units 1025a, 1026a transmit the fetched first feature map and first weight to the first MAC array 1027a for each channel. For example, the first dispatch units 1025a, 1026a select weights and corresponding feature maps, for example, for each of k (here, k is a natural number) channels, and may transmit the weights and corresponding feature maps to the first MAC array 1027a.

The first MAC array 1027a executes the multiplication accumulation operation on the data transmitted from the first dispatch units 1025a, 1026a. For example, the first MAC array 1027a executes the multiplication accumulation operation on data for each of the k channels. Further, the first MAC array 1027a outputs the first operation result R11 and the second operation result R12.

Then, as described above, the first operation result R11 is provided to the first backend module 104a, and the second operation result R12 may be provided to the second backend module 104b of the second neural processing unit 100b through the first bridge 111.

On the other hand, the first backend module 104a included in the first neural processing unit 100a of the neural processing system 10 according to an embodiment of the present disclosure includes a first summation unit 1041a, a first activation unit 1043a and a first writeback unit 1045a.

The first summation unit 1041a executes the summation operation on the first operation result R11 and the fourth operation result R22 to produce a summation result. Here, the fourth operation result R22 may be provided from the second frontend module 102b of the second neural processing unit 100b via the second bridge 112.

The first activation unit 1043a may execute the activation operation on the execution result of the summation operation to produce an activation result. In some embodiments of the present disclosure, the activation operation may include an operation using an activation function such as rectified linear unit (ReLU), Sigmoid, and tanh, but the scope of the present disclosure is not limited thereto.

The first writeback unit 1045a executes a writeback operation of providing an execution result of the activation operation to the first frontend module 102a. Specifically, the first writeback unit 1045a may store the execution result of the activation operation in the first internal memories 1021a, 1022a.

On the other hand, the second frontend module 102b included in the second neural processing unit 100b of the neural processing system 10 according to an embodiment of the present disclosure includes multiple second internal memories 1022b, multiple second fetch units 1023b, 1024b, multiple second dispatch units 1025b, 1026b and a second MAC array 1027b.

The plurality of second internal memory 1021b, 1022b may store the second feature map and the second weight used by the second frontend module 102b for the feature extraction operation of the data DATA21, DATA22. In this embodiment, the second internal memories 1021b, 1022b may be implemented as an SRAM, but the scope of the present disclosure is not limited thereto.

The second fetch units 1023b, 1024b fetch the second feature map and the second weight from each of the second internal memories 1021b, 1022b, and transmit them to the second dispatch units 1025b, 1026b.

The second dispatch units 1025b, 1026b transmit the fetched second feature map and second weight to the second MAC array 1027b for each channel. For example, the second dispatch units 1025b, 1026b select weights and corresponding feature maps, for example, for each of k (here, k is a natural number) channels, and may transmit them to the second MAC array 1027b.

The second MAC array 1027b executes a multiplication accumulation operation on the data transmitted from the second dispatch units 1025b, 1026b. For example, the second MAC array 1027b executes the multiplication accumulation operation on data for each of k channels. Further, the second MAC array 1027b outputs the third operation result R21 and the fourth operation result R22.

Then, as described above, the third operation result R21 is provided to the second backend module 104b, and the fourth operation result R21 may be provided to the first backend module 104a of the first neural processing unit 100a through the second bridge 112.

On the other hand, the second backend module 104b included in the second neural processing unit 100b of the neural processing system 10 according to an embodiment of the present disclosure includes a second summation unit 1041b, a second activation unit 1043b, and a second writeback unit 1045b.

The second summation unit 1041b executes a summation operation on the third operation result R21 and the second operation result R12 to produce a summation result. Here, the second operation result R12 may be provided from the first frontend module 102a of the first neural processing unit 100a through the first bridge 111.

The second activation unit 1043b may execute the activation operation on the execution result of the summation operation to produce an execution result. In some embodiments of the present disclosure, the activation operation may include an operation which uses an activation function such as rectified linear unit (ReLU), Sigmoid and tanh, but the scope of the present disclosure is not limited thereto.

The second writeback unit 1045b executes a writeback operation for providing the execution result of the activation operation to the second frontend module 102b. Specifically, the second writeback unit 1045b may store the execution result of the activation operation in the second internal memories 1021b, 1022b.

Figure 4:
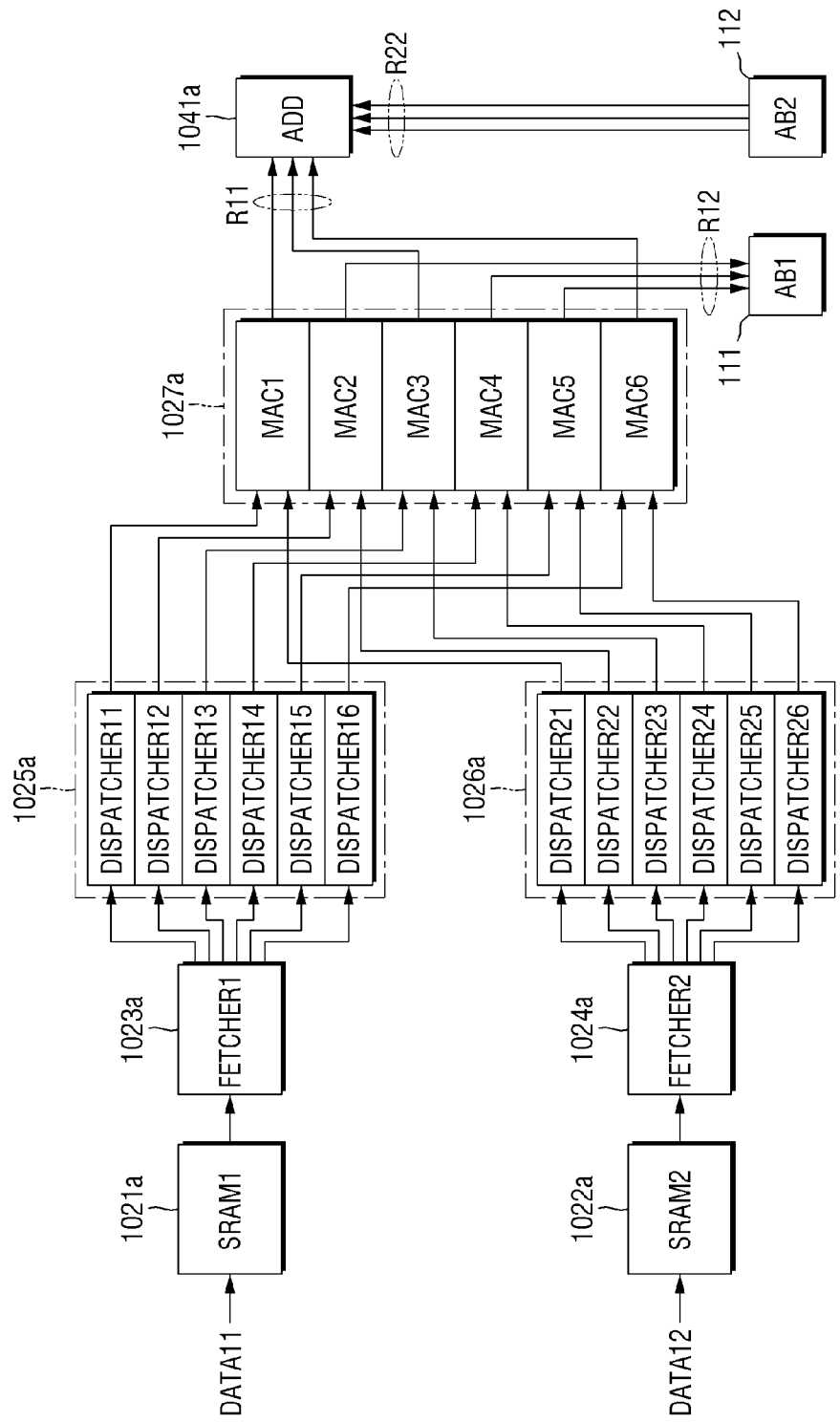
FIGS. 4 and 5 are block diagrams illustrating a frontend module of the neural processing system according to an embodiment of the present disclosure.
Figure 5:
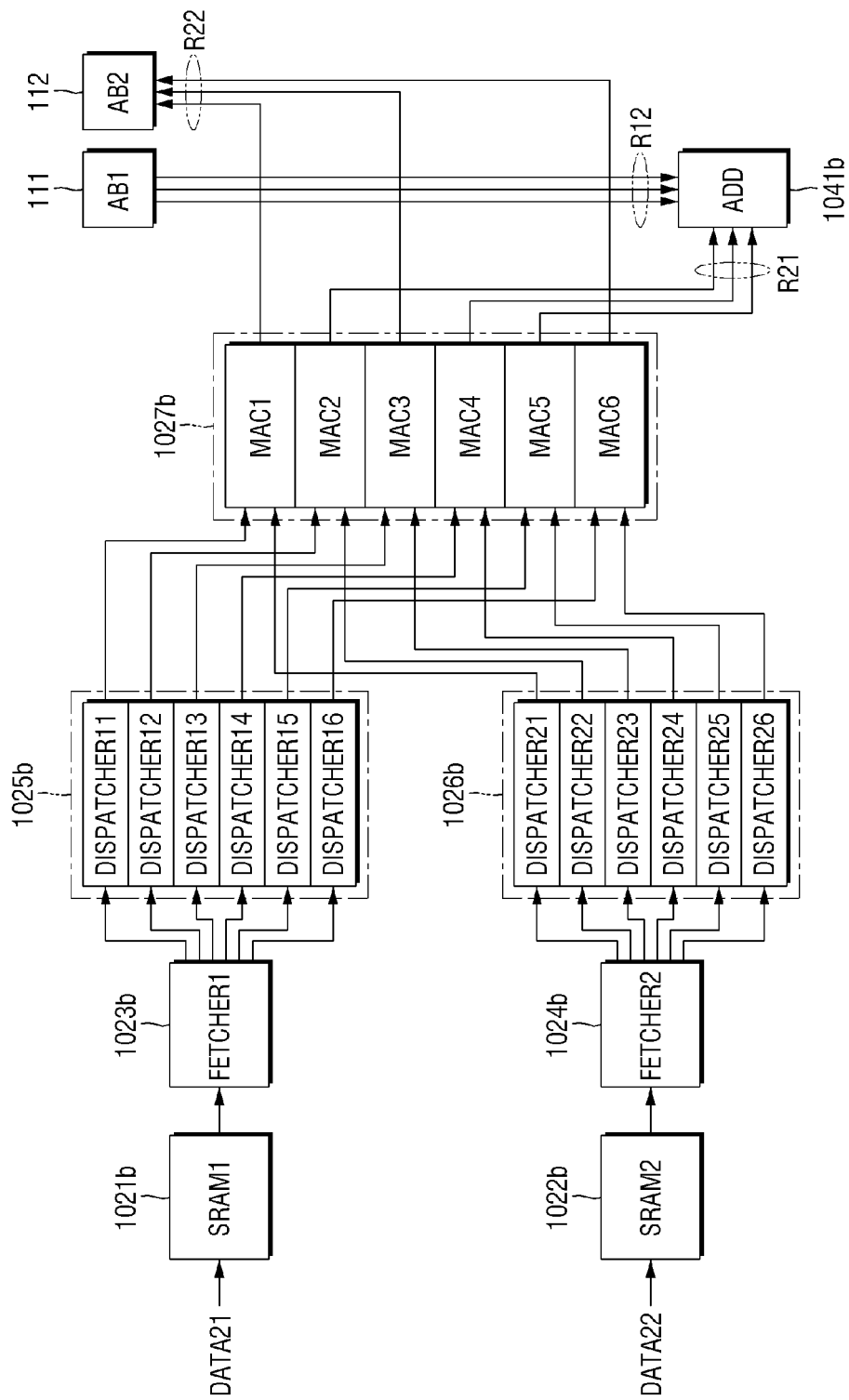

FIGS. 4 and 5 are block diagrams illustrating the frontend module of the neural processing system according to an embodiment of the present disclosure.

Referring to FIG. 4, each of the first internal memories 1021a, 1022a stores a first feature map and a first weight used for feature extraction operation on data DATA11 and data DATA12. The first fetch unit 1023a, 1024a fetch the first feature map and the first weight from each of the first internal memories 1021a, 1022a, and transmit the first feature map and the first weight to the first dispatch units 1025a, 1026a.

The first dispatch unit 1025a selects the weight and the corresponding feature map for each of the six channels of the data DATA11 and transmits them to the first MAC array 1027a. The first dispatch unit 1026a transmits the weight and the corresponding feature map for each six channels of the data DATA12 and transmits them to the first MAC array 1027a.

The first MAC array 1027a executes the multiplication accumulation operation on the data transmitted from the first dispatch units 1025a, 1026a for each of the six channels.

In this embodiment, the first operation result R11 among the operation results, which are output from the first MAC array 1027a, corresponds to the result of the multiplication accumulation operation for the first, third and sixth channels. The second operation result R12 corresponds to the result of the multiplication accumulation operation for the second, fourth and fifth channels.

The first operation result R11 is provided to the first summation unit 1041a of the first backend module 104a, and the second operation result R12 is provided to the first bridge 111 for transmission to the second neural processing unit 100b operating in the other clock domain. On the other hand, the first summation unit 1041a of the first backend module 104a receives the operation result of the second neural processing unit 100b operating in the other clock domain via the second bridge 112, for example, a fourth operation result R22.

Next, referring to FIG. 5, each of the second internal memories 1021b, 1022b stores a second feature map and a second feature map used for feature extraction operation on the data DATA21 and data DATA22. The second fetch units 1023b, 1024b fetch the second feature map and the second weight from each of the second internal memories 1021b, 1022b and transmit them to the second dispatch units 1025b, 1026b.

The second dispatch unit 1025b selects the weight and the corresponding feature map for each of the six channels of the data DATA21 and transmits the selected weight map and the corresponding feature map to the second MAC array 1027b. The second dispatch unit 1026b selects the weight and the corresponding feature map for each of the six channels of data DATA22 and transmits the selected weight and the corresponding feature map to the second MAC array 1027b.

The second MAC array 1027b executes the multiplication accumulation operation on the data transmitted from the second dispatch units 1025b, 1026b for each of the six channels.

In this embodiment, the third operation result R21 among the operation results, which are output from the second MAC array 1027b, corresponds to the result of multiplication accumulation operations on the second, fourth and fifth channels. The fourth operation result R22 corresponds to the result of multiplication accumulation operation on the first, third and sixth channels.

The third operation result R21 is provided to the second summation unit 1041b of the second backend module 104b, and the fourth operation result R22 is provided to the second bridge 112 for transmission to the first neural processing unit 100a operating in the other clock domain. On the other hand, the second summation unit 1041b of the second backend module 104b receives the operation result of the first neural processing unit 100a operating in the other clock domain via the first bridge 111, for example, the second operation result R12.

Figure 6:
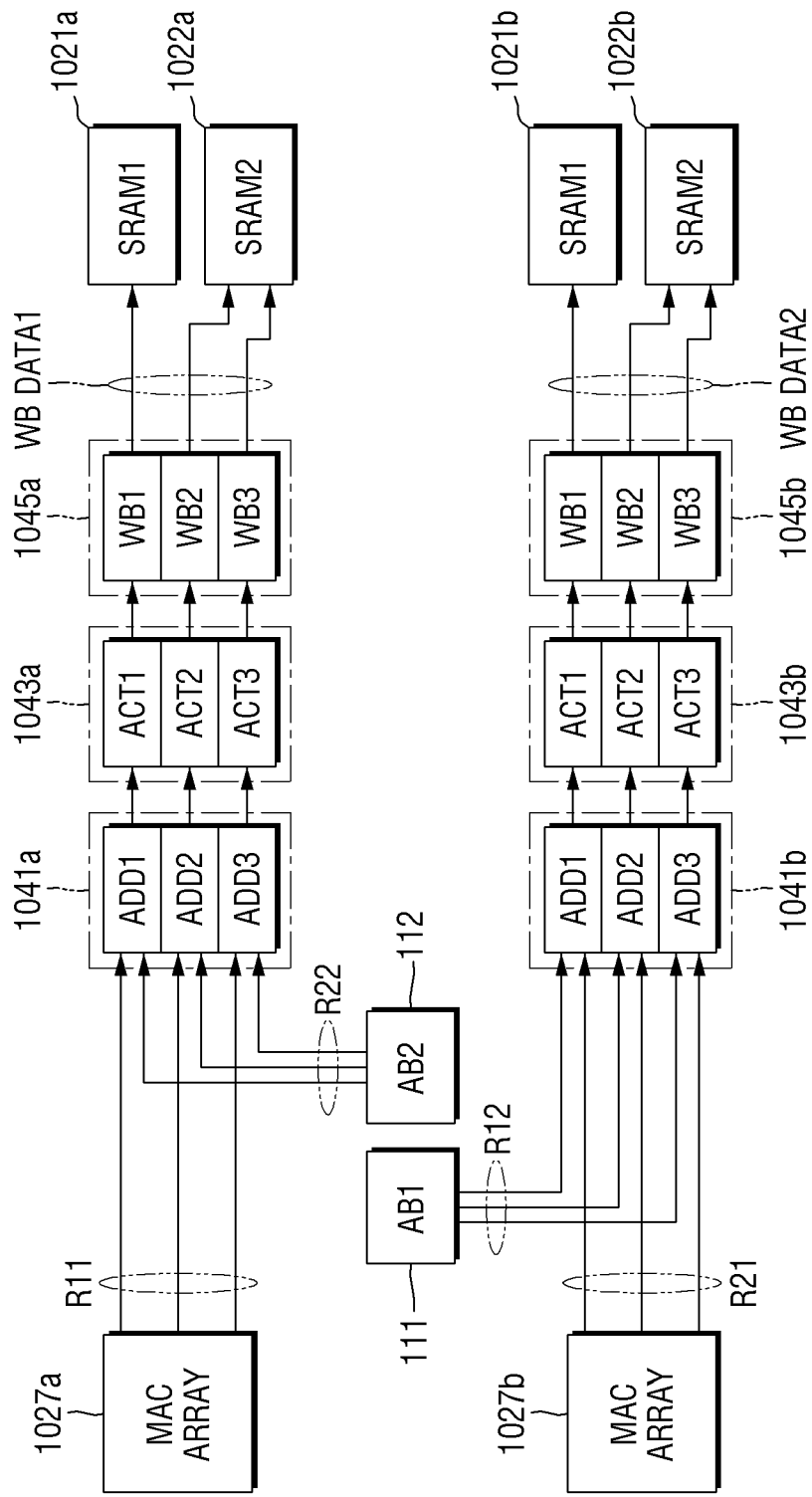
FIG. 6 is a block diagram illustrating a backend module of the neural processing system according to an embodiment of the present disclosure.

FIG. 6 is a block diagram illustrating a backend module of a neural processing system according to an embodiment of the present disclosure.

Referring to FIG. 6, the first summation unit 1041a performs a summation operation on the first operation result R11 and the fourth operation result R22 for each channel to produce a summation result. In FIGS. 4 and 5, since the total first operation result R11 includes the values of three channels among the six channels, and the fourth operation result R22 also includes the values of three channels, the summation on each of them is executed for three channels.

Subsequently, the first activation unit 1043a executes the activation operation on the execution result of the summation operation for each channel to produce an activation result, and the first writeback unit 1045a executes the writeback operation for providing the execution result of the activation operation to the first frontend module 102a for each channel. For example, the first writeback unit 1045a may write-back the data corresponding to the first channel among the execution results of activation operations back in the first internal memory 1021a and may write-back the data corresponding to the second and third channels in the first internal memory 1022a.

On the other hand, the second summation unit 1041b also executes the summation operation on the third operation result R21 and the second operation result R12 for each channel to produce a summation result. In FIGS. 4 and 5, since the total third operation result R21 includes the values of three channels among the six channels, and the second operation result R12 also includes the values of three channels, the summation of each of them is executed for three channels.

Subsequently, the second activation unit 1043b executes the activation operation on the execution result of the summation operation for each channel to produce an activation result. The second writeback unit 1045b executes the writeback operation for providing the execution result of the activation operation to the second frontend module 102b for each channel. For example, the second writeback unit 1045b may write-back the data corresponding to the first channel among the execution results of the activation operation in the second internal memory 1021b and may write-back the data corresponding to the second and third channels in the second internal memory 1022b.

Figure 7:
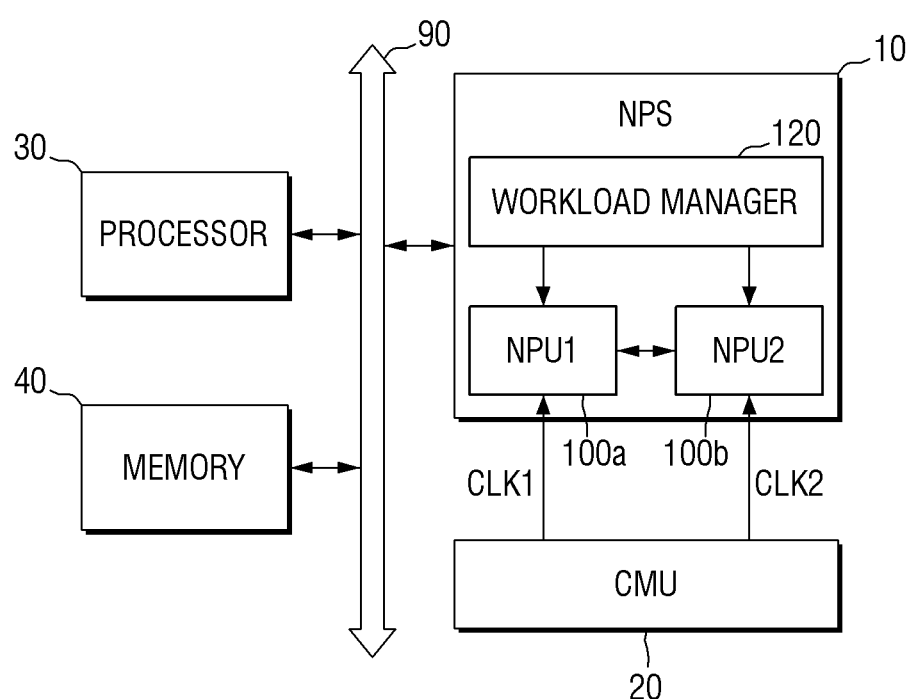
FIG. 7 is a schematic diagram illustrating a computing system according to another embodiment of the present disclosure.
Figure 8:
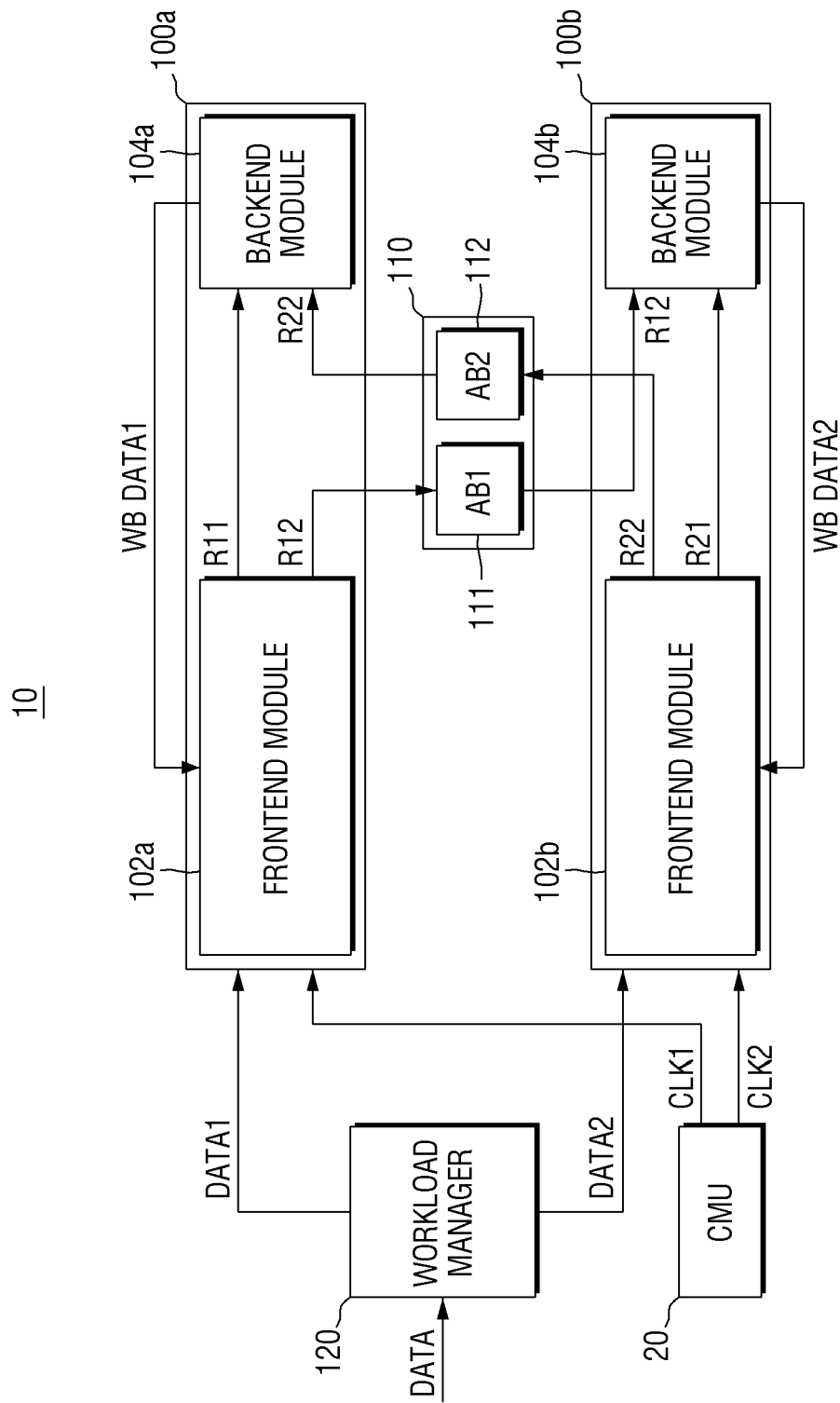
FIG. 8 is a block diagram illustrating a neural processing system according to another embodiment of the present disclosure.

FIG. 7 is a schematic diagram illustrating a computing system according to another embodiment of the present disclosure, and FIG. 8 is a block diagram illustrating a neural processing system according to another embodiment of the present disclosure.

Referring to FIGS. 7 and 8, unlike the embodiment of FIG. 1, the neural processing system 10 of the computing system 2 according to this embodiment further includes a workload manager 120. As explained herein, the use of a workload manager such as the workload manager 120 enhances the practical ability to selectively control individual of the multiple neural processing units in a manner that lowers power consumption, increases power consumption, lowers processing speeds or increases processing speeds.

The workload manager 120 allocates the first data DATA1 among the data DATA for executing the feature extraction to the first neural processing unit 100a. The workload manager 120 allocates the second data DATA2 among the data DATA to the second neural processing unit 100b. Specifically, the workload manager 120 allocates the first data DATA1 among the data DATA for executing the feature extraction to the first frontend module 102a and allocates the second data DATA2 among the data DATA to the second frontend module 102b.

As a result, the first frontend module 102a executes the feature extraction operation on the first data DATA1 using the first feature map and the first weight. The second frontend module 102b may execute the feature extraction operation on the second data DATA2 using the second feature map and the second weight.

In particular, in some embodiments of the present disclosure, an amount of first data DATA1 and an amount of second data DATA2 may be different from each other.

The clock management unit 20 controls the frequency of at least one of the first clock signal CLK1 and the second clock signal CLK2 and may control the performance and power of the first neural processing unit 100a and the second neural processing unit 100b in accordance with the allocation operation of the workload manager 120. For example, the clock management unit 20 may execute the clock gating on at least one of the first frontend module 102a, the first backend module 104a, the second frontend module 102b and the second backend module 104b in accordance with the allocation operation of the workload manager 120.

In this way, the neural processing system 10 according to various embodiments of the present disclosure may control the clock signals of multiple of the first neural processing unit 100a, and the second neural processing unit 100b therein to control the performance or the power consumption. For example, in order to improve the performance of the first neural processing unit 100a and to lower the power consumption of the second neural processing unit 100b, the clock management unit 20 may increase the frequency of the first clock signal CLK1 for driving the first neural processing unit 100a and may decrease the frequency of the second clock signal CLK2 for driving the second neural processing unit 100b. As another example, in a special situation in which only the first neural processing unit 100a is used and the second neural processing unit 100b is not used, the clock gating may be executed by controlling the second clock signal CLK2 for driving the second neural processing unit 100b. Therefore, according to the computing system including the neural processing system 10 according to various embodiments of the present disclosure, artificial intelligence can be achieved, while lowering the cost and power consumption.

Figure 9:
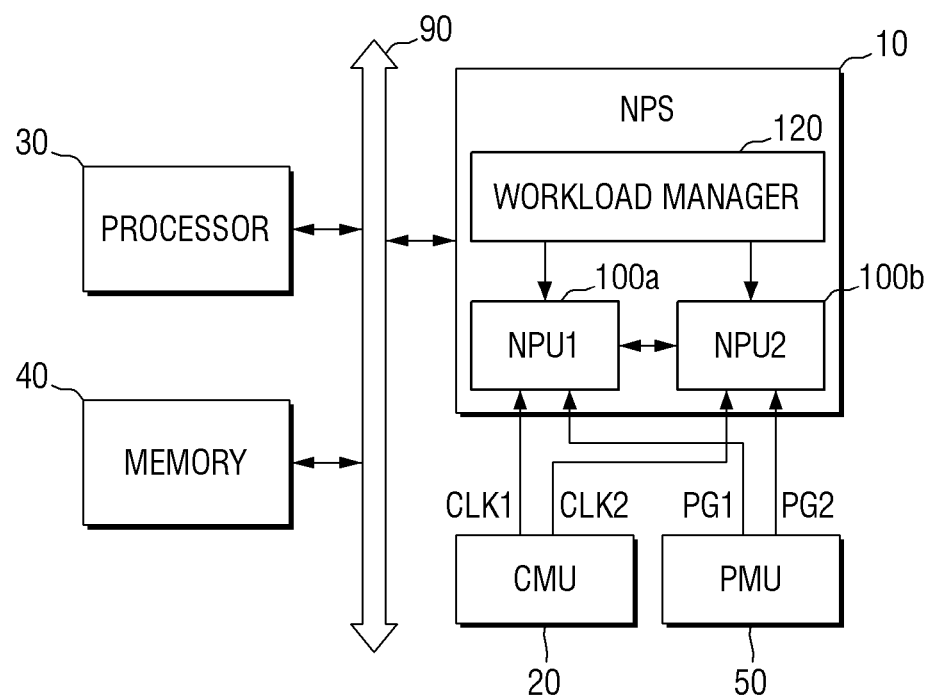
FIG. 9 is a schematic diagram illustrating a computing system according to still another embodiment of the present disclosure.
Figure 10:
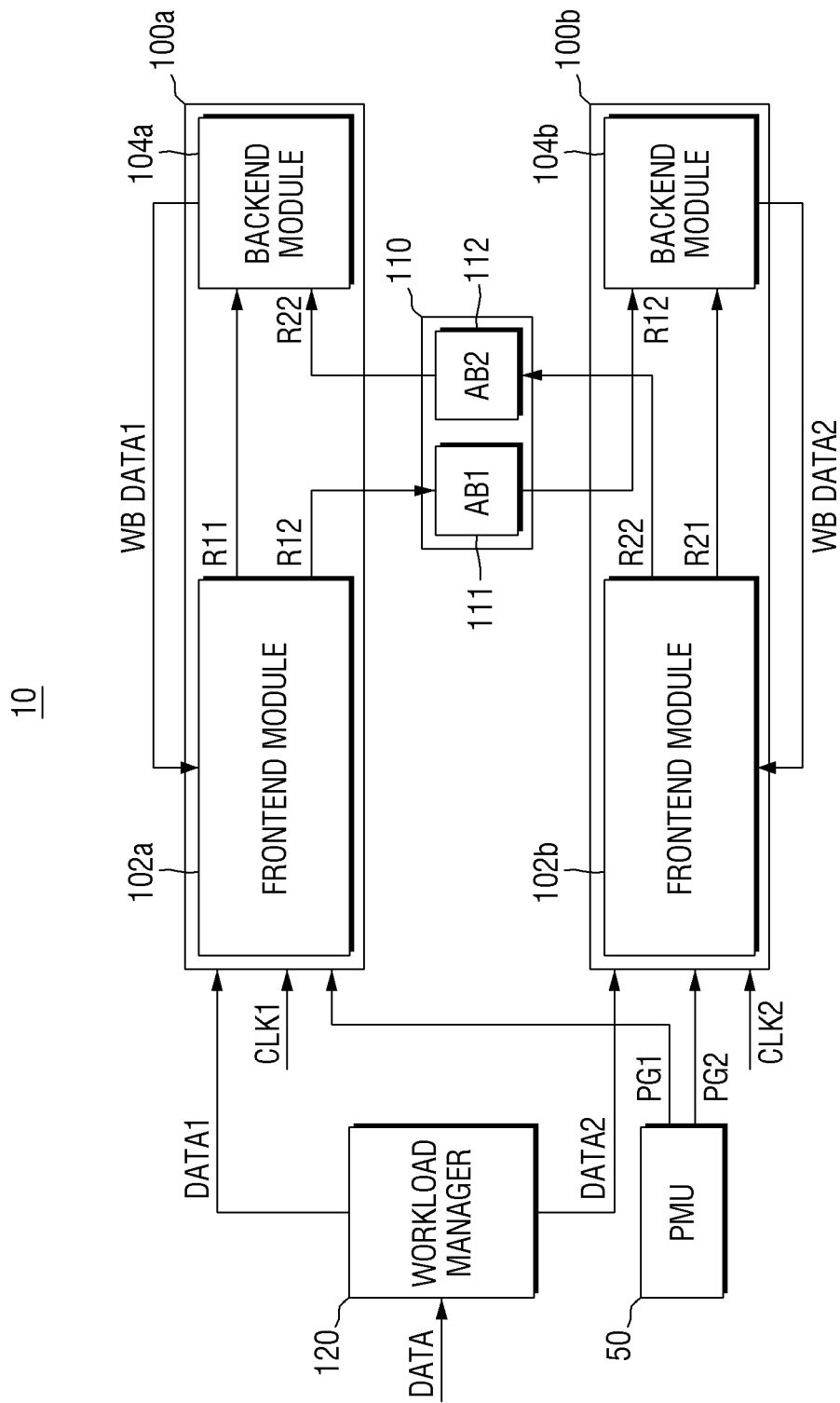
FIG. 10 is a block diagram illustrating a neural processing system according to still another embodiment of the present disclosure.

FIG. 9 is a schematic diagram illustrating a computing system according to still another embodiment of the present disclosure, and FIG. 10 is a block diagram illustrating a neural processing system according to another embodiment of the present disclosure.

Referring to FIGS. 9 and 10, unlike the embodiments of FIGS. 7 and 8, the computing system 3 according to this embodiment further includes a power management unit 50 (PMU). As explained herein, the use of a power management unit such as the power management unit 50 enhances the practical ability to selectively control power to individual neural processing units among multiple neural processing units in a manner that lowers power consumption, increases power consumption, lowers processing speeds or increases processing speeds.

As described above, the workload manager 120 allocates the first data DATA1 among the data DATA for executing the feature extraction to the first frontend module 102a and allocates the second data DATA2 among the data DATA to the second frontend module 102b.

As a result, the first frontend module 102a may execute the feature extraction operation on the first data DATA1 using the first feature map and the first weight. The second frontend module 102b may execute the feature extraction operation on the second data DATA2 using the second feature map and the second weight.

The power management unit 50 provides the first power gating signal PG1 to the first neural processing unit 100a and provides the second power gating signal PG2 to the second neural processing unit 100b. Specifically, the power management unit 50 may provide the first power gating signal PG1 to the first frontend module 102a and the first backend module 104a. The power management unit 50 may provide the second power gating signal PG2 to the second frontend module 102b and the second backend module 104b.

The power management unit 50 may control at least one value of the first power gating signal PG1 and the second power gating signal PG2, thereby executing the power control of the first neural processing unit 100a and the second neural processing unit 100b in response to the allocation operation of the workload manager 120. For example, the power management unit 50 may execute the power gating on at least one of the first frontend module 102a, the first backend module 104a, the second frontend module 102b and the second backend module 104b.

In this way, the neural processing system 10 according to various embodiments of the present disclosure may execute the power gating on at least a part of the first neural processing unit 100a and the second neural processing unit 100b as required, thereby lowering the power consumption of the neural processing system 10. Therefore, according to the computing system including the neural processing system 10 according to the various embodiments of the present disclosure, artificial intelligence can be achieved, while lowering the cost and power consumption.

Figure 11:
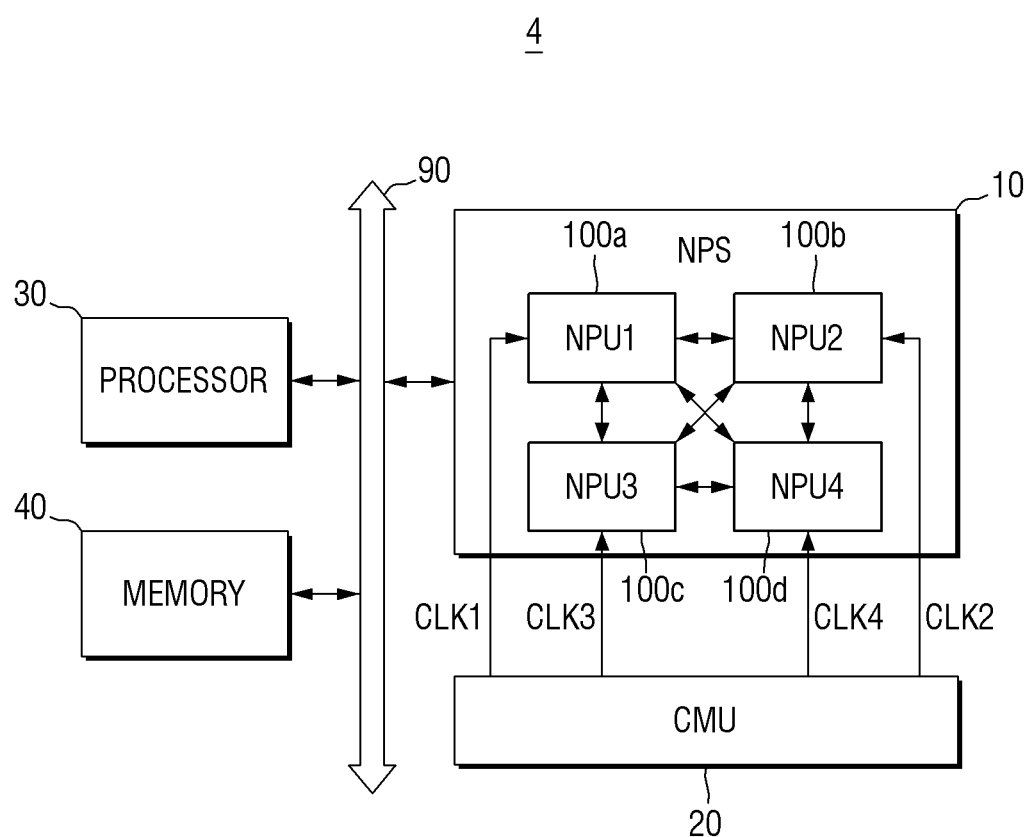
FIG. 11 is a schematic diagram illustrating a computing system according to still another embodiment of the present disclosure.

FIG. 11 is a schematic diagram illustrating a computing system according to another embodiment of the present disclosure.

Referring to FIG. 11, the computing system 4 according to this embodiment includes the first neural processing unit 100a, the second neural processing unit 100b, the third neural processing unit 100c and the fourth neural processing unit 100d. For convenience of explanation, the neural processing system 10 is illustrated as including the first neural processing unit 100a, the second neural processing unit 100b, the third neural processing unit 100c and the fourth neural processing unit 100d in this embodiment, but the scope of the present disclosure is not limited thereto.

The clock management unit 20 generates the first clock signal CLK1, the second clock signal CLK2, the third clock signal CLK3 and the fourth clock signal CLK4 for driving the neural processing system 10. The clock management unit 20 provides the clock signals to each of the first neural processing unit 100a, the second neural processing unit 100b, the third neural processing unit 100c, and the fourth neural processing unit 100d. Thus, the first neural processing unit 100a is driven in accordance with the first clock signal CLK1. The second neural processing unit 100b is driven in accordance with the second clock signal CLK2. The third neural processing unit 100c is driven in accordance with the third clock signal CLK3. The fourth neural processing unit 100d is driven in accordance with the fourth clock signal CLK4.

In some embodiments of the present disclosure, all the frequencies of the first clock signal CLK1, the second clock signal CLK2, the third clock signal CLK3 and the fourth clock signal CLK4 may not be the same. In other words, all the clock domains in which the first neural processing unit 100a, the second neural processing unit 100b, the third neural processing unit 100c and the fourth neural processing unit 100d operate may not be the same.

The clock management unit 20 may control each of the frequencies of the first clock signal CLK1, the second clock signal CLK2, the third clock signal CLK3 and the fourth clock signal CLK4, as required. Further, the clock management unit 20 may also execute the clock gating on at least one of the first clock signal CLK1, the second clock signal CLK2, the third clock signal CLK3 and the fourth clock signal CLK4 as needed.

Figure 12:
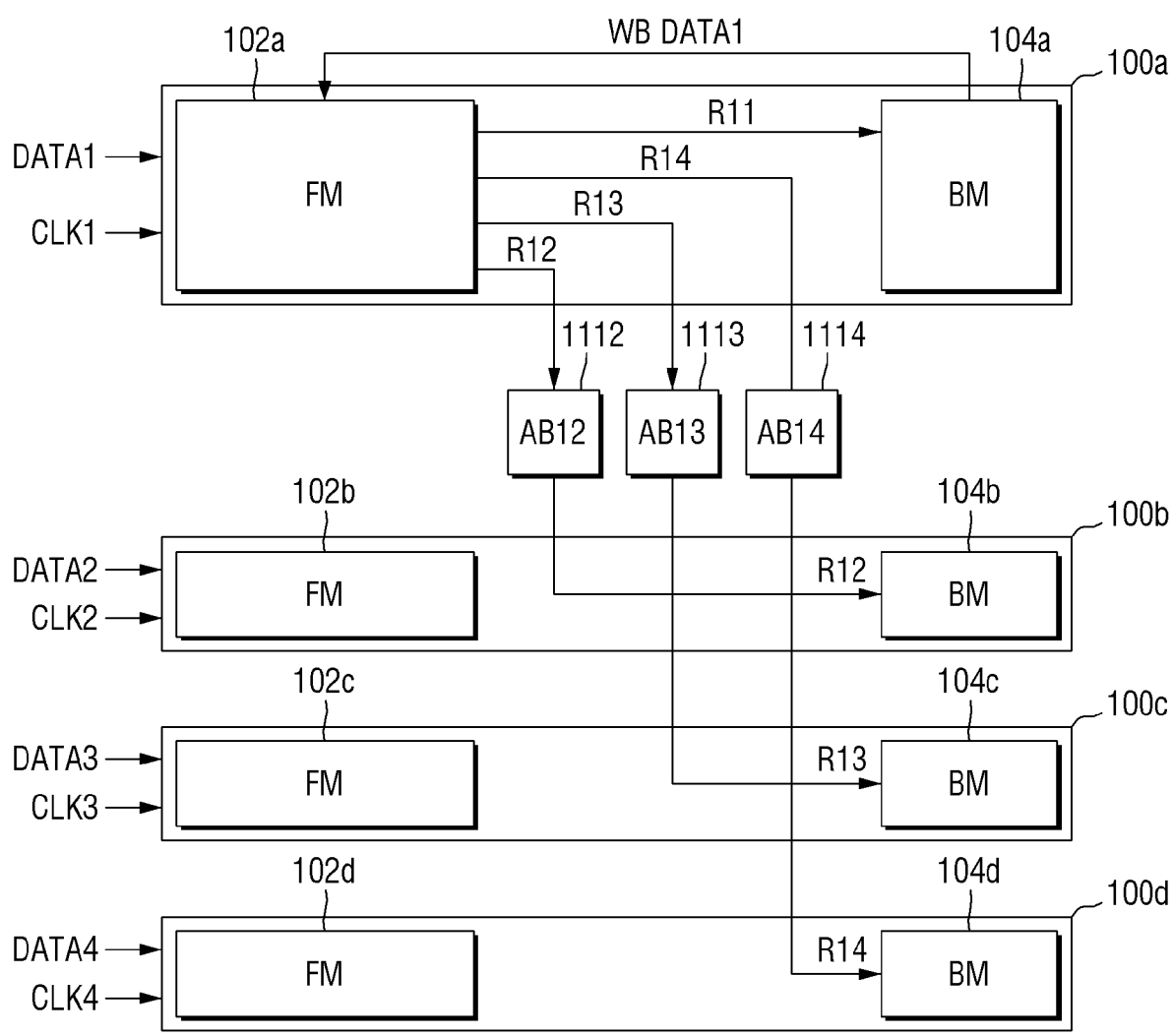
FIGS. 12 and 13 are block diagrams illustrating a neural processing system according to still another embodiment of the present disclosure.
Figure 13:
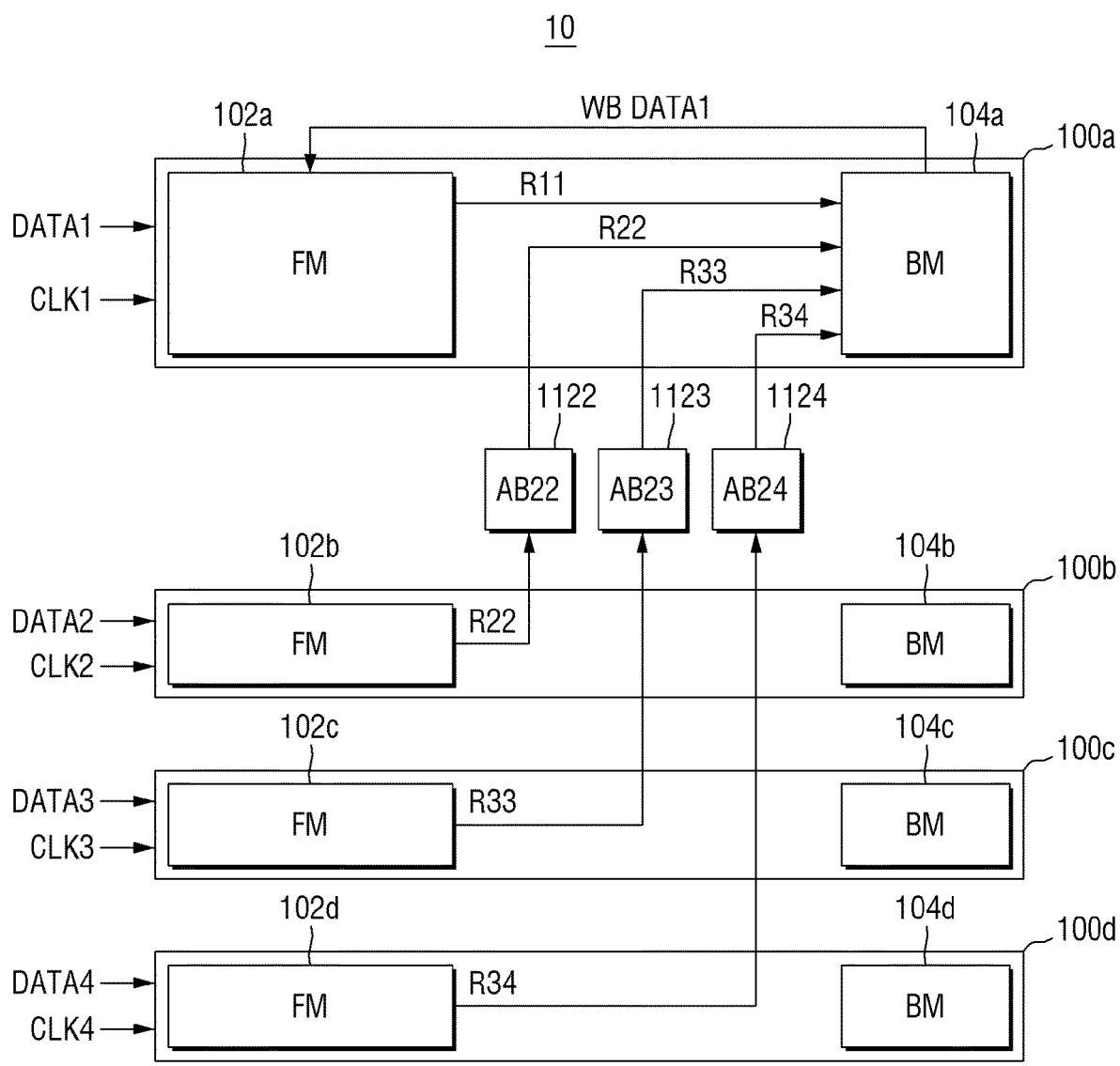

FIGS. 12 and 13 are block diagrams illustrating a neural processing system according to still another embodiment of the present disclosure.

Referring to FIG. 12, the neural processing system 10 according to this embodiment includes a first neural processing unit 100a to a fourth neural processing unit 100d. One or more bridges 1112, 1113 and 1114 are disposed between the first neural processing unit 100a and the fourth neural processing unit 100d.

The bridge 1112 transmits an intermediate result R12 generated by the operation of the first neural processing unit 100a to the second neural processing unit 100b. The bridge 1113 transmits an intermediate result R13 generated by the operation of the first neural processing unit 100a, the second neural processing unit 100b and the third neural processing unit 100c. Further, the bridge 1114 transmits an intermediate result R14 generated by the operation of the first neural processing unit 100a, the second neural processing unit 100b, the third neural processing unit 100c and the fourth neural processing unit 100d.

To this end, the first neural processing unit 100a and the second neural processing unit 100b may operate in mutually different clock domains. In this circumstance, the bridge 1112 may be electrically connected to the first neural processing unit 100a and the second neural processing unit 100b operating in the clock domain different from the first neural processing unit 100a. Similarly, the bridge 1113 may be electrically connected to the first neural processing unit 100a and the third neural processing unit 100c operating in the clock domain different from the first neural processing unit 100a. The bridge 1114 may be electrically connected to the first neural processing unit 100a and the fourth neural processing unit 100d operating in the clock domain different from the first neural processing unit 100a.

As a result, the bridges 1112, 1113 and 1114 are implemented as asynchronous bridges to enable the data transmission between different clock domains.

Subsequently, referring to FIG. 13, one or more bridges 1122, 1123 and 1124 are disposed between the first neural processing unit 100a and the fourth neural processing unit 100d.

The bridge 1122 transmits an intermediate result R22 generated by the operation of the second neural processing unit 100b to the first neural processing unit 100a. The bridge 1123 transmits an intermediate result R33 generated by the operation of the third neural processing unit 100c to the first neural processing unit 100a. Further, the bridge 1124 transmits an intermediate result R44 generated by the operation of the fourth neural processing unit 100d to the first neural processing unit 100a.

To this end, the first neural processing unit 100a and the second neural processing unit 100b may operate in mutually different clock domains. In this circumstance, the bridge 1122 may be electrically connected to the first neural processing unit 100a and the second neural processing unit 100b operating in the clock domain different from the first neural processing unit 100a. Similarly, the bridge 1123 may be electrically connected to the first neural processing unit 100a and the third neural processing unit 100c operating in the clock domain different from the first neural processing unit 100a. The bridge 1124 may be electrically connected to the first neural processing unit 100a and the fourth neural processing unit 100d operating in the clock domain different from the first neural processing unit 100a.

As a result, the bridges 1112, 1113 and 1114 are implemented as asynchronous bridges to enable the data transmission between different clock domains.

In the embodiments of FIGS. 12 and 13, the bridges between the second neural processing unit 100b, the third neural processing unit 100c and the fourth neural processing unit 100d different from the first neural processing unit 100a have been described, but the scope of the present disclosure is not limited thereto, and such a content may also be similarly applied between the third neural processing unit 100c and the fourth neural processing unit 100d different from the second neural processing unit 100b, and between the third neural processing unit 100c and the fourth neural processing unit 100d.

Figure 14:
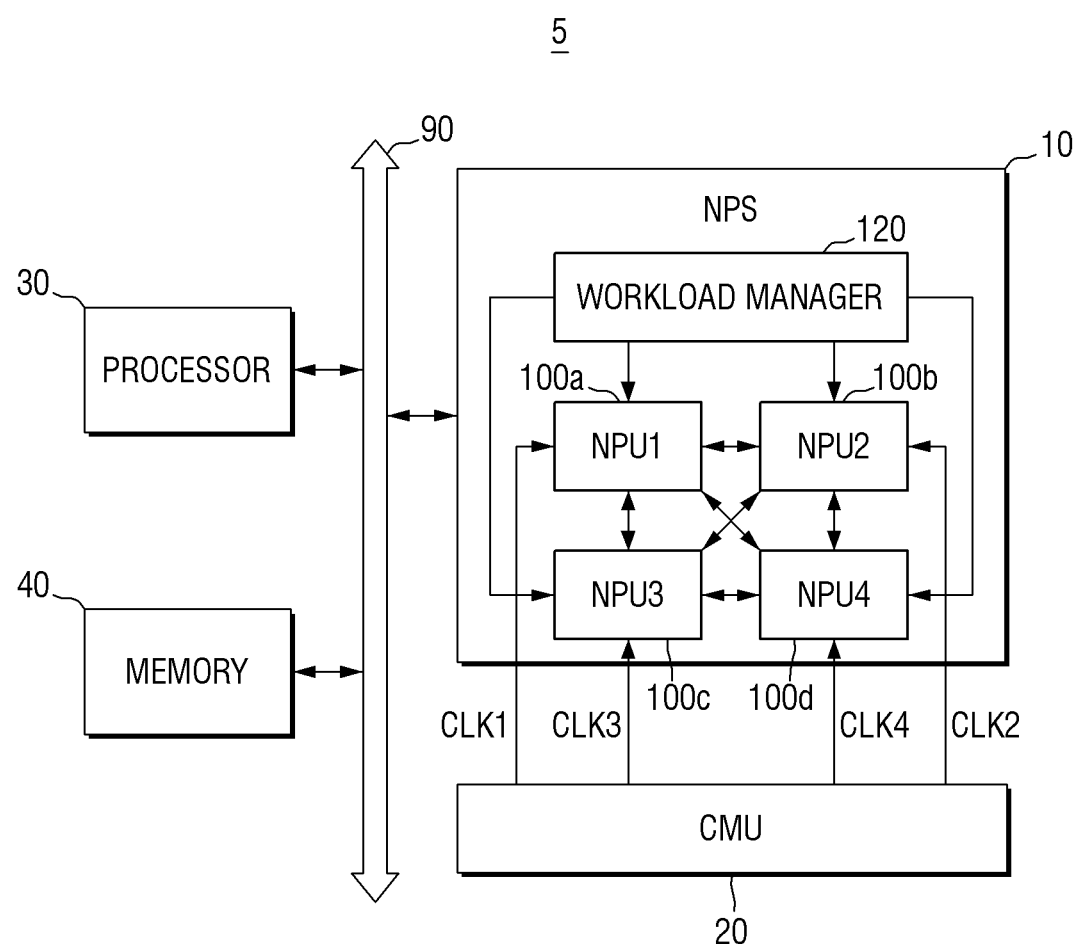
FIG. 14 is a block diagram illustrating a computing system according to still another embodiment of the present disclosure.

FIG. 14 is a block diagram illustrating a computing system according to still another embodiment of the present disclosure.

Referring to FIG. 14, the neural processing system 10 of the computing system 5 according to this embodiment further includes a workload manager 120. Similar to the description of FIGS. 7 and 8, the workload manager 120 may distribute and allocate the data DATA for executing the feature extraction to the first neural processing unit 100a, the second neural processing unit, the third neural processing unit, and the fourth neural processing unit 100d. Further, all the amount of data distributed from the first neural processing unit 100a to the fourth neural processing unit 100d may not be the same.

The clock management unit 20 may controls the frequency of at least one of the first clock signal CLK1 to the fourth clock signal CLK4 to control the performance and the power of the first neural processing unit 100a to the fourth neural processing unit 100d in response to the allocation operation of the workload manager 120, in the same way as explained with reference to FIGS. 7 and 8.

In this way, the neural processing system 10 according to various embodiments of the present disclosure may control the clock signals of the first neural processing unit 100a, the second neural processing unit 100b, the third neural processing unit 100c and the fourth neural processing unit and 100d therein, thereby controlling the performance or the power consumption. For example, in order to improve the performance of the first neural processing unit 100a, the second neural processing unit 100b and the third neural processing unit 100c, and to lower the power consumption of the fourth neural processing unit 100d, the clock management unit 20 may increase the frequency of the first clock signal CLK1, the second clock signal CLK2 and the third clock signal CLK3 for driving the first neural processing unit 100a to the third neural processing unit 100c, and may decrease the frequency of the fourth clock signal CLK4 for driving the fourth neural processing unit 100d. As still another example, when only the first neural processing unit 100a and the second neural processing unit 100b are used, and the third neural processing unit 100c and the fourth neural processing unit 100d are not used, the clock gating may be executed, by controlling the third clock signal CLK3 and the fourth clock signal CLK4 for driving the third neural processing unit 100c and the fourth neural processing unit 100d. Therefore, according to the computing system including the neural processing system 10 according to various embodiments of the present disclosure, artificial intelligence can be achieved, while lowering the cost and power consumption.

Figure 15:
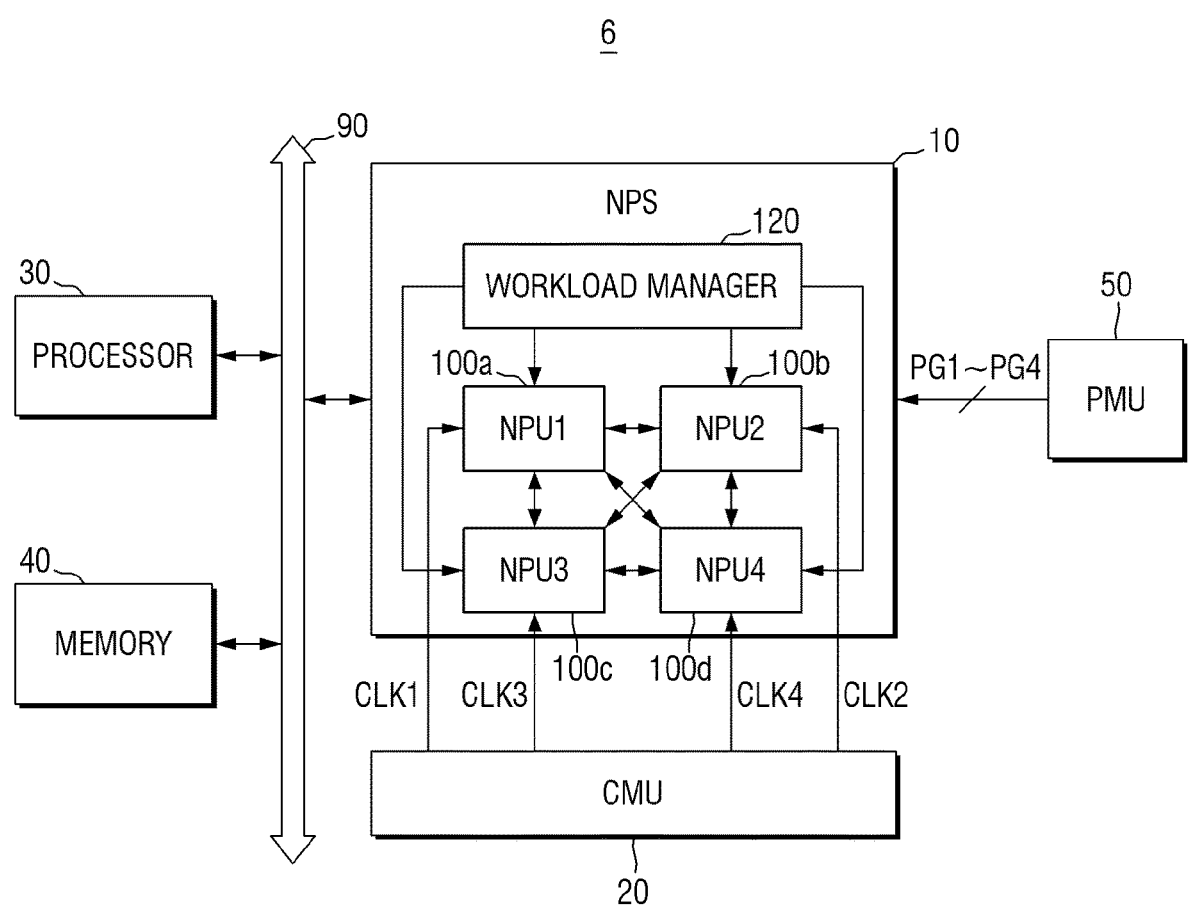
FIG. 15 is a block diagram illustrating a computing system according to still another embodiment of the present disclosure.

FIG. 15 is a block diagram illustrating a computing system according to still another embodiment of the present disclosure.

Referring to FIG. 15, unlike the embodiment of FIG. 14, the neural processing system 10 of the computing system 6 according to this embodiment further includes a power management unit 50 (PMU).

As described above, the workload manager 120 allocates and distributes data DATA for executing the feature extraction to the first neural processing unit 100a, the second neural processing unit 100b, the third neural processing unit 100c and the fourth neural processing unit 100d.

The power management unit 50 provides the first power gating signal PG1, the second power gating signal PG2, the third power gating signal PG3 and the fourth power gating signal PG4 to the first neural processing unit 100a, the second neural processing unit 100b, the third neural processing unit 100c and the fourth neural processing unit 100d.

The power management unit 50 may control at least one value of the first power gating signal PG1, the second power gating signal PG2, the third power gating signal PG3 and the fourth power gating signal PG4, thereby executing the power control of the first neural processing unit 100a, the second neural processing unit 100b, the third neural processing unit 100c and the fourth neural processing unit 100d in response to the allocation operation of the workload manager 120, in the same way as described with reference to FIGS. 9 and 10.

In this way, the neural processing system 10 according to various embodiments of the present disclosure may lower the power consumption of the neural processing system 10, by executing power gating as needed on one or more of the first neural processing unit 100a, the second neural processing unit 100b, the third neural processing unit 100c and the fourth neural processing unit 100d. Therefore, according to the computing system including the neural processing system 10 according to various embodiments of the present disclosure, artificial intelligence can be achieved, while lowering the cost and power consumption.

Figure 16:
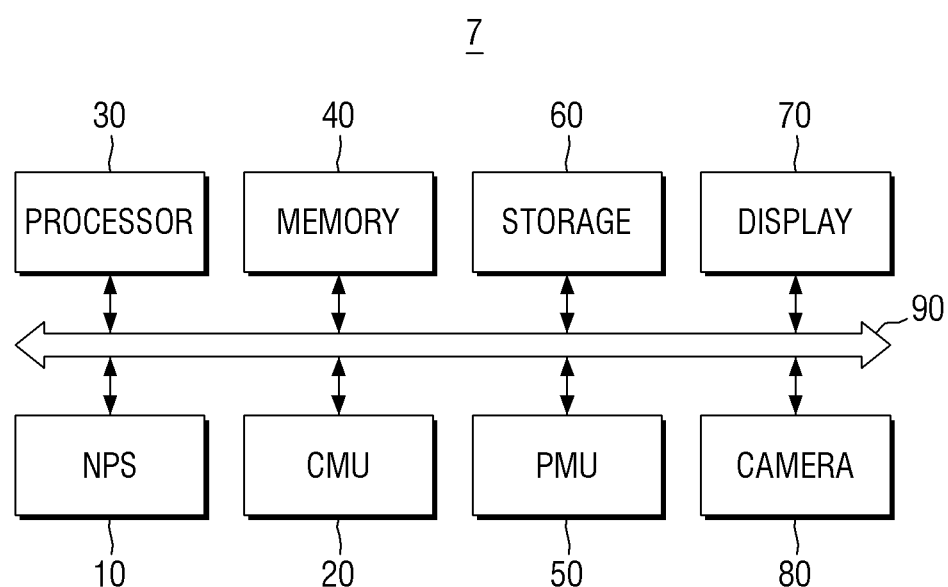
FIG. 16 is a block diagram illustrating a computing system according to still another embodiment of the present disclosure.

FIG. 16 is a block diagram illustrating a computing system according to still another embodiment of the present disclosure.

Referring to FIG. 16, the computing system 7 according to this embodiment may be a computing system that includes a neural processing system 10, a clock management unit 20, a processor 30, a memory 40, a power management unit 50, a storage 60, a display 70 and a camera 80. The neural processing system 10, the clock management unit 20, the processor 30, the memory 40, the power management unit 50, the storage 60, the display 70 and the camera 80 may transmit and receive data through a bus 90.

In some embodiments of the present disclosure, the computing system 7 may be a mobile computing system. For example, the computing system 7 may be a computing system, including smart phones, tablet computers, laptop computers, and the like. Of course, the scope of the present disclosure is not limited thereto.

The neural processing system 10 according to various embodiments of the present disclosure as explained so far is capable of executing the feature extraction operation on the image data generated via the camera 80 or the image data stored in the storage 60, using CNN with low cost and low power.

As described above, the neural processing system 10 adopts an architecture including multiple neural processing units capable of individually controlling the clock and the power, thereby faithfully implementing and executing the artificial intelligence, while reducing the cost and power consumption.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A neural processing system, comprising:
    a first frontend module which executes a feature extraction operation using a first feature map and a first weight, and outputs a first operation result and a second operation result;
    a second frontend module which executes the feature extraction operation using a second feature map and a second weight, and outputs a third operation result and a fourth operation result;
    a first backend module which receives an input of the first operation result provided from the first frontend module and the fourth operation result provided from the second frontend module via a second bridge to sum up the first operation result and the fourth operation result; and
    a second backend module which receives an input of the third operation result provided from the second frontend module and the second operation result provided from the first frontend module via a first bridge to sum up the third operation result and the second operation result.

2. The neural processing system of claim 1, wherein the first frontend module and the first backend module are driven according to a first clock signal, and
    the second frontend module and the second backend module are driven according to a second clock signal having a frequency different from the first clock signal.

3. The neural processing system of claim 1, wherein the first bridge and the second bridge are asynchronous bridges.

4. The neural processing system of claim 1, wherein the first backend module provides first writeback data to the first frontend module, and the second backend module provides second writeback data to the second frontend module.

5. The neural processing system of claim 1, wherein the first frontend module comprises:

a plurality of first internal memories which store the first feature map and the first weight, a plurality of first fetch units which fetch the first feature map and the first weight from each of the plurality of first internal memories, a plurality of first dispatch units which transmit the fetched first feature map and first weight to a first MAC array (multiplication and accumulation array) for each channel, and the first MAC array which executes a multiplication accumulation operation on data transmitted from the plurality of first dispatch units.

6. The neural processing system of claim 5, wherein the first MAC array outputs the first operation result and the second operation result, the first operation result is provided to the first backend module, and the second operation result is provided to the second backend module through the first bridge.

7. The neural processing system of claim 1, wherein the second frontend module comprises:

a plurality of second internal memories which store the second feature map and the second weight, a plurality of first fetch units which fetch the second feature map and the second weight from each of the plurality of second internal memories, a plurality of second dispatch units which transmit the fetched second feature map and second weight to a second MAC array (multiplication and accumulation array) for each channel, and the second MAC array which executes a multiplication accumulation operation on data transmitted from the plurality of second dispatch units.

8. The neural processing system of claim 1, further comprising:

a workload manager which allocates first data among the data for executing the feature extraction to the first frontend module, and allocates second data among the data to the second frontend module, wherein the first frontend module executes the feature extraction operation on the first data, using the first feature map and the first weight, and the second frontend module executes the feature extraction operation on the second data, using the second feature map and the second weight.

9. The neural processing system of claim 8, wherein an amount of the first data and an amount of the second data are different from each other.

10. The neural processing system of claim 8, further comprising:

a clock management unit which provides a first clock signal to the first frontend module and the first backend module, and provides a second clock signal to the second frontend module and the second backend module, wherein the clock management unit controls a frequency of at least one of the first clock signal and the second clock signal to execute clock gating on at least one of the first frontend module, the first backend module, the second frontend module and the second backend module, in accordance with an allocation operation of the workload manager.

11. The neural processing system of claim 8, further comprising:

a power management unit which provides a first power gating signal to the first frontend module and the first backend module, and provides a second power gating signal to the second frontend module and the second backend module, wherein the power management unit controls at least one value of the first power gating signal and the second power gating signal to execute power gating on at least one of the first frontend module, the first backend module, the second frontend module and the second backend module, in accordance with an allocation operation of the workload manager.

12. A neural processing system, comprising:

a first neural processing unit including a first frontend module and a first backend module; and a bridge unit electrically connected to the first neural processing unit, and a second neural processing unit operating in a clock domain different from the first neural processing unit, wherein the first frontend module provides a part of a first operation result obtained by executing a feature extraction operation using a first feature map and a first weight, to the first backend module, the bridge unit provides a part of a second operation result executed in the second neural processing unit, to the first backend module, and the first backend module sums up the part of the first operation result and the part of the second operation result.

13. The neural processing system of claim 12, wherein the bridge unit is electrically connected to a third neural processing unit operating in a clock domain different from the first neural processing unit, the first frontend module provides the other part of the first operation result to the bridge unit, and the bridge unit provides the other part of the first operation result to the third neural processing unit.

14. The neural processing system of claim 12, wherein the first frontend module comprises:

a plurality of first internal memories which store the first feature map and the first weight, a plurality of first fetch units which fetch the first feature map and the first weight from each of the plurality of first internal memories, a plurality of first dispatch units which transmit the fetched first feature map and first weight to a first MAC array (multiplication and accumulation array) for each channel, and the first MAC array which executes a multiplication accumulation operation on data transmitted from the plurality of first dispatch units and outputs the first operation result.

15. A neural processing system, comprising:

a first neural processing unit including a first frontend module and a first backend module;

a second neural processing unit including a second frontend module and a second backend module; and a workload manager which allocates first data among data for executing feature extraction to the first neural processing unit, and allocates second data among the data to the second neural processing unit, wherein the first frontend module executes a feature extraction operation on the first data, using a first feature map and a first weight, and outputs a first operation result and a second operation result, the second frontend module executes the feature extraction operation on the second data, using a second feature map and a second weight, and outputs a third operation result and a fourth operation result, and the first backend module sums up the first operation result and the fourth operation result, and the second backend module sums up the third operation result and the second operation result.

16. The neural processing system of claim 15, further comprising:

a clock management unit which provides a first clock signal to the first frontend module and the first backend module, and provides a second clock signal to the second frontend module and the second backend module, wherein the clock management unit controls a frequency of at least one of the first clock signal and the second clock signal to execute clock gating on at least one of the first frontend module, the first backend module, the second frontend module and the second backend module, in accordance with an allocation operation of the workload manager.

17. The neural processing system of claim 15, further comprising:

a power management unit which provides a first power gating signal to the first frontend module and the first backend module, and provides a second power gating signal to the second frontend module and the second backend module, wherein the power management unit controls at least one value of the first power gating signal and the second power gating signal to execute power gating on at least one of the first frontend module, the first backend module, the second frontend module and the second backend module, in accordance with an allocation operation of the workload manager.

18. The neural processing system of claim 15, wherein the first neural processing unit is driven according to a first clock signal, and the second neural processing unit is driven according to a second clock signal having a frequency different from the first clock signal.

19. The neural processing system of claim 15, wherein the first frontend module comprises:

a plurality of first internal memories which store the first feature map and the first weight, a plurality of first fetch units which fetch the first feature map and the first weight from each of the plurality of first internal memories, a plurality of first dispatch units which transmit the fetched first feature map and first weight to a first MAC array (multiplication and accumulation array) for each channel, and the first MAC array which executes a multiplication accumulation operation on data transmitted from the plurality of first dispatch units.

20. The neural processing system of claim 15, wherein the second frontend module comprises:

a plurality of second internal memories which store the second feature map and the second weight, a plurality of first fetch units which fetch the second feature map and the second weight from each of the plurality of second internal memories, a plurality of second dispatch units which transmit the fetched second feature map and second weight to a second MAC array (multiplication and accumulation array) for each channel, and the second MAC array which executes a multiplication accumulation operation on data transmitted from the plurality of second dispatch units.

* * * * *